INVENTOR.
ROBERT J. SHANAHAN
BY
Andrus & Starke
ATTORNEYS

United States Patent Office 3,319,614
Patented May 16, 1967

3,319,614
MARINE ENGINE COOLING SYSTEM
Robert J. Shanahan, Neenah, Wis., assignor to Kiekhaefer Corporation, Fond du Lac, Wis., a corporation of Delaware
Filed Dec. 17, 1964, Ser. No. 419,041
6 Claims. (Cl. 123—41.08)

This invention relates to a marine engine cooling system in which recirculation of water is obtained through passages in the engine block and engine head and means are provided to maintain the passages in the block and head of the engine full of water at all times during operation.

Generally, marine cooling systems are allowed to drain during periods of inoperation of the engine to avoid undue corrosion of parts as from brackish water.

During engine operation it is desired to have a recirculating system that functions with an over-supply of water available to effect the cooling by a controlled replacement of water in the recirculating portion of the system dependent upon the thermal conditions involved as effected through a thermostatically controlled discharge valve. For this purpose it is necessary to provide an escape for excess water supplied to the system.

It has been suggested heretofore, as in Patent No. 3,105,472, to E. P. Jasper, to employ a pressure relief valve controlling the escape of the excess water supplied to the system, thereby keeping the supply line and the recirculating portion of the system under pressure at all times. There is always a danger, however, with this construction that the pressure relief valve sticks either open or closed or at some intermediate point, thereby causing trouble.

The present invention eliminates the use of a pressure relief valve and thereby avoids these difficulties.

In order to fill the recirculating system with water upon starting of the engine and to maintain the system full of water during operation of the engine, the present invention employs a high overflow discharge for the entire system and which is high enough to provide a predetermined constant hydraulic head on the system at all times, and at the same time eliminating all semblance of any restriction upon the free discharge of water. When the engine is not running the system generally drains slowly back through the pump.

The accompanying drawings illustrate several different engine cooling systems employing the invention as presently contemplated to be the best modes for carrying out this invention.

Figure 1:
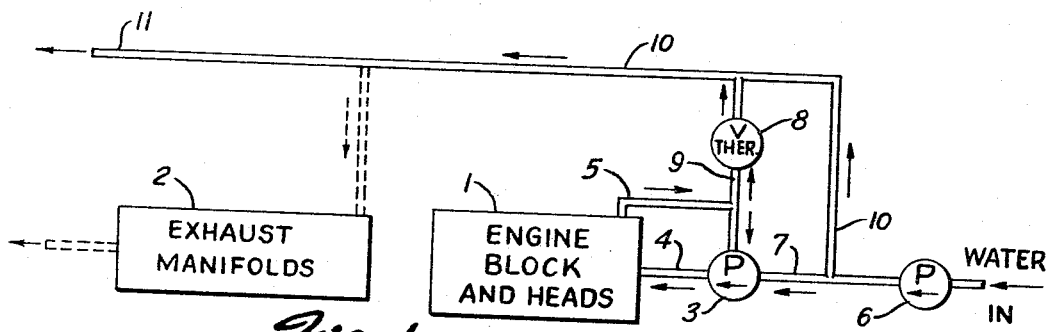
FIGURE 1 is a schematic view of an engine cooling system employing a recirculating portion for the engine block and head and the high overflow discharge of the present invention.

Referring to the construction of FIGURE 1, the principal parts of the engine to be cooled are shown in block diagram as the engine block and heads 1 and the exhaust manifolds 2. It will be understood that suitable water cooling passages are provided in these parts 1 and 2 to effect the desired cooling when water is caused to flow therethrough.

It is desirable to recirculate the water through block 1 until a given temperature is reached giving the desired efficiency of engine operation and then to maintain that temperature by regulating the escape of heated water from the recirculating portion of the system and the corresponding supply thereto of cool water to replace that which escapes.

For this purpose a recirculating pump 3 is connected by line 4 to force water into the passages of block 1 as indicated by the arrow, and line 5 returns the water from block 1 to pump 3.

A water supply pump 6 feeds water from the body of water upon which the boat is floating to the intake side of pump 3 by line 7.

A thermostatically controlled valve 8 is disposed in a discharge line 9 connected to line 5.

An overflow discharge line 10 connects with line 7 and serves to discharge the excess water coming from the supply pump 6. In FIG. 1 the line 9 is shown as discharging into line 10. Line 10 discharges back into the source of water which is generally the body of water upon which the boat floats. If desired line 10 may be discharged through the manifold cooling block 2.

In carrying out the invention the overflow discharge line 10 receiving the excess water from pump 6 and also the water from valve 8 is disposed to have an effective discharge point 11 at a height substantially above the engine block 1 and the recirculating system represented by block 1, pump 3 and lines 4 and 5. Point 11 should be the highest point in the system. In this way a constant head of water is maintained at the inlet to pump 3 to assure that the recirculating system is always full of water and to thereby pressurize the system for operation of the thermostatic escape valve 8.

Figure 2:
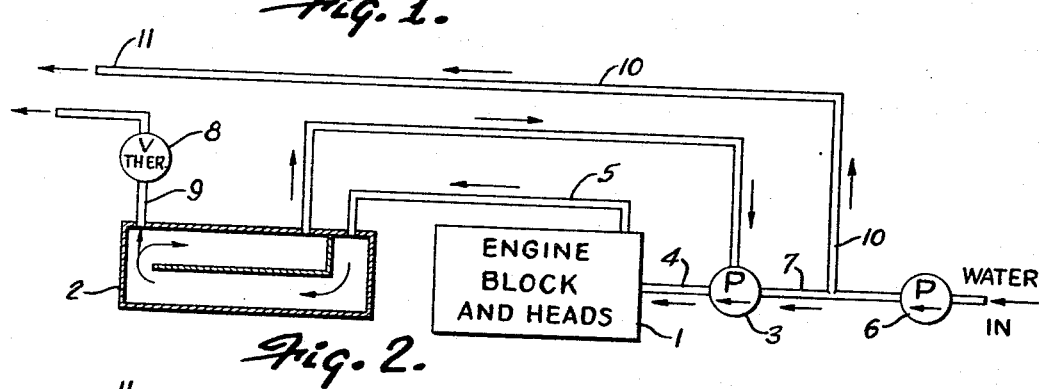
FIG. 2 is a similar schematic view showing a modified cooling system in which the manifold cooling portion is included in the recirculating portion of the system.

In the modification of FIG. 2 the recirculating system is made to include both the engine block 1 and manifold block 2 the latter having divided water passages therein.

The discharge through the thermostat valve 8 may be located at any convenient point in the recirculation system. In FIG. 2 valve 8 discharges from the far end of the manifold block 2, while in FIG. 1 the valve 8 discharges from return line 5.

Also it is not necessary that the thermostat line 9 connect with the discharge line 10. In FIG. 1 line 9 which is controlled by thermostat valve 8 is shown as discharging into line 10, while in FIG. 2 the line 9 discharges separately from the overflow discharge line 10.

The overflow discharge line 10 of FIG. 2 has the high discharge point 11 the same as that in FIG. 1 to provide the assurance that the system will always be full of water and that there will be discharge through the thermostat valve 8.

Figure 3:
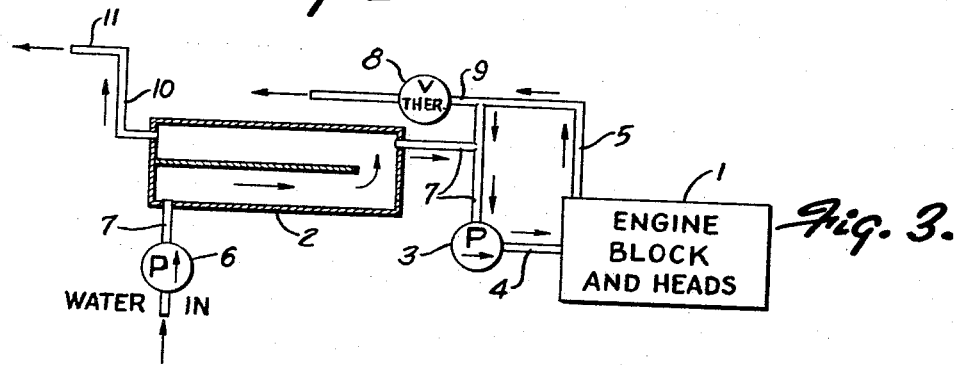
FIG. 3 is a similar schematic view showing a modified cooling system in which the manifold cooling portion is in advance of the recirculating portion and has a separate overflow.

In the construction of FIG. 3 the manifold block 2 is connected in line 7 and has divided passages so that line 7 continues from one end of the manifold to the recirculating system for block 1 on the inlet side of pump 3, and overflow discharge line 10 connects at the other end of the manifold.

The recirculating system in this construction only applies to the engine block 1 as shown also in FIG. 1, and the line 9 discharges from the recirculating system through valve 8 and back to the source.

Figure 4:
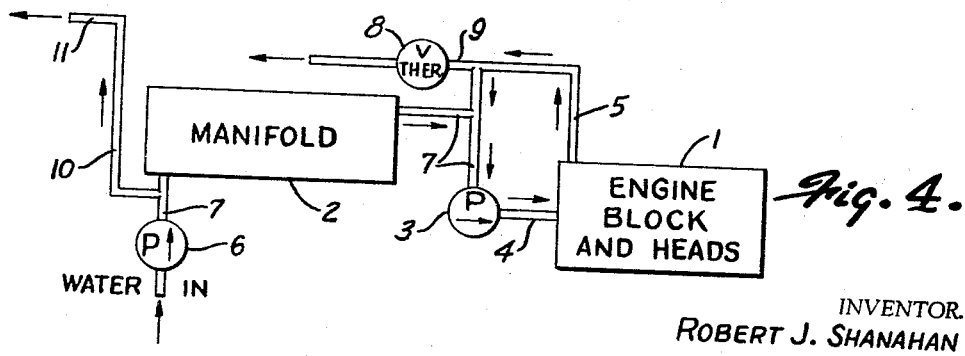
FIG. 4 is a similar schematic view showing a variation of the system of FIG. 3.

In the variation illustrated in FIG. 4 the manifold block 2 does not have divided passages and overflow discharge line 10 is connected to line 7 ahead of the manifold block 2.

In this construction of FIG. 4 the only water cooling the manifolds is that which enters the recirculating system as water is discharged through thermostat valve 8.

In the construction of FIG. 3 all of the water from supply pump 6 flows through the manifold block 2.

In the construction of FIG. 2 the water flowing through the manifold block 2 is the same as that in the recirculating system.

In the construction of FIG. 1 the water flowing through the manifold block 2 is the combined discharge from the overflow line 10 and which includes the water from valve 8 and the excess water from pump 6.

In all of the constructions illustrated the high point of discharge 11 for line 10 maintains the desired water in the system during operation and at the same time provides freedom of discharge with substantially no danger of clogging. The head of water thus provided is built into the system at the factory and is not subject to adjustment by users or repair men.

Various modes of carrying out the invention are contemplated as being within the scope of the following claims particularly pointing out and distinctly claiming the subject matter which is regarded as the invention.

I claim:

1. A marine engine cooling system, comprising a recirculating system including the cooling passages in the engine block and head, a pump in said recirculating system to effect the recirculation of water therein during operation of the engine, a thermostatically regulated discharge line from said recirculation system adapted to discharge water therefrom when the water in the system exceeds a predetermined temperature, a water supply pump connected between a source of water and said recirculating system to supply water to the system in correlation to said discharge of water from the system, said supply pump providing water at a substantially greater rate than needed to replenish the water in said recirculating system, and an overflow discharge line connected between said supply pump and said recirculating system for free discharge of the excess water above that needed by said recirculating system, said thermostatically regulated discharge line and said overflow discharge line having effective discharge points substantially above all parts of said recirculation system whereby a substantially constant head of water is maintained in the system during operation.

2. The construction of claim 1 in which said thermostatically regulated discharge line connects with said overflow discharge line to provide a common discharge for the water.

3. The construction of claim 2 in which said overflow discharge line connects with passages for cooling the engine manifold and which receive said common discharge therefrom.

4. The construction of claim 1 in which said recirculation system includes passages for cooling the manifold.

5. The construction of claim 1 in which cooling passages for the engine manifold are connected between the supply pump and said recirculating system.

6. The construction of claim 5 in which the cooling passages in the engine manifold are divided into two branches and one branch discharges into said recirculating system and the other branch discharges into said overflow discharge line.

References Cited by the Examiner

UNITED STATES PATENTS

| | | | |
|---|---|---|---|
| 1,361,033 | 12/1920 | Ericson | 123—41.08 |
| 2,228,446 | 1/1941 | Drapeau | 123—41.09 |
| 2,327,342 | 8/1943 | Drapeau | 123—41.09 |
| 2,345,233 | 3/1944 | Bradley | 123—41.29 |
| 2,401,646 | 6/1946 | Johnson | 123—41.09 |
| 3,105,472 | 10/1963 | Jasper | 123—41.08 |
| 3,163,157 | 12/1964 | Connell | 123—41.09 |

FOREIGN PATENTS 1,090,730  10/1954  France.

MARK NEWMAN, *Primary Examiner.*

AL LAWRENCE SMITH, *Examiner.*